Figure 1:
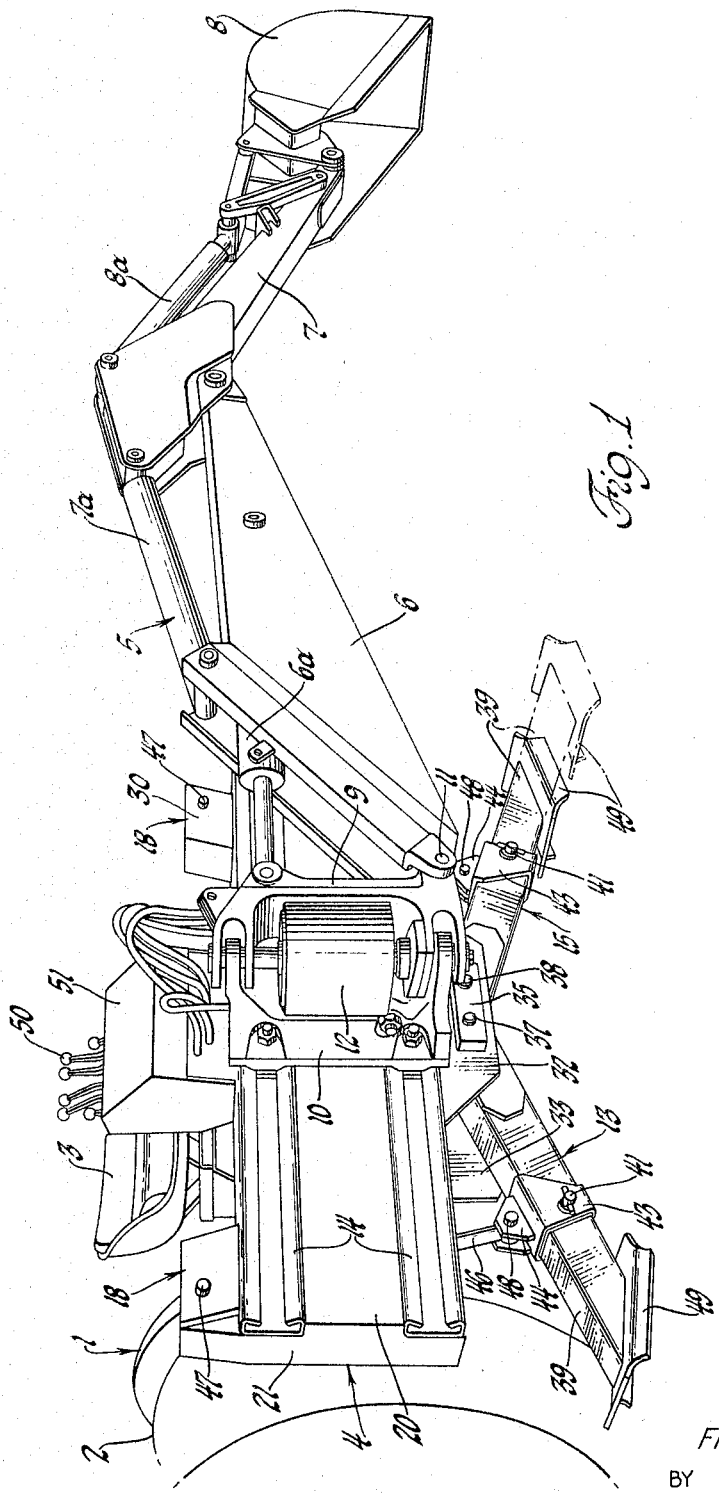

Oct. 4, 1966                F. W. NOLLER              3,276,603
                             BOOM SUPPORT
Filed April 5, 1965                              2 Sheets-Sheet 1

INVENTOR
FRED W. NOLLER
BY
Tweedale & Gerhardt
ATTORNEYS

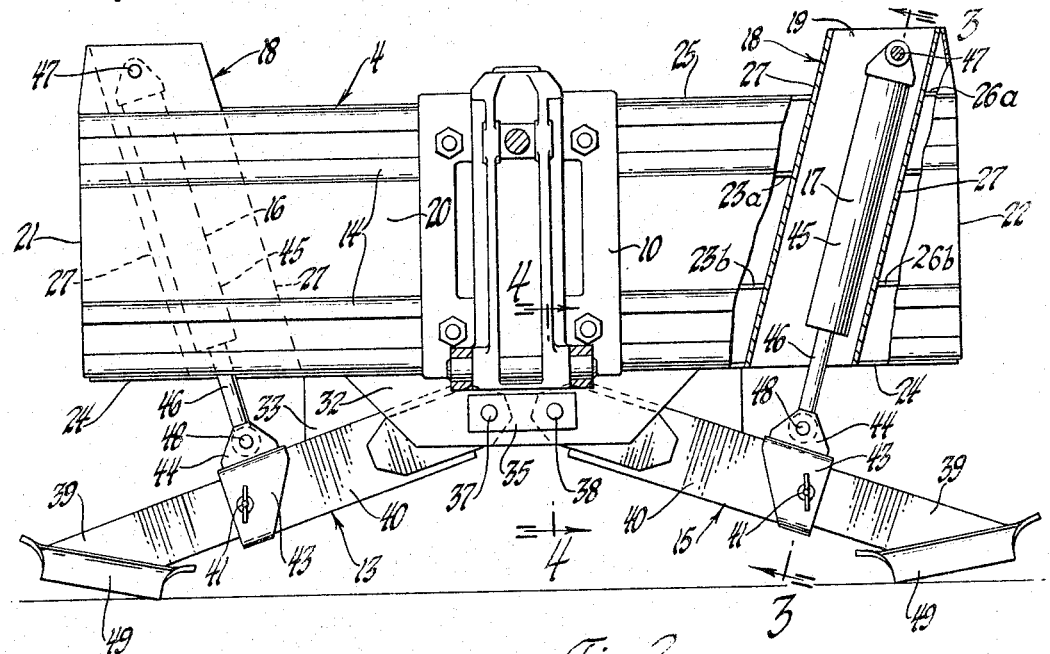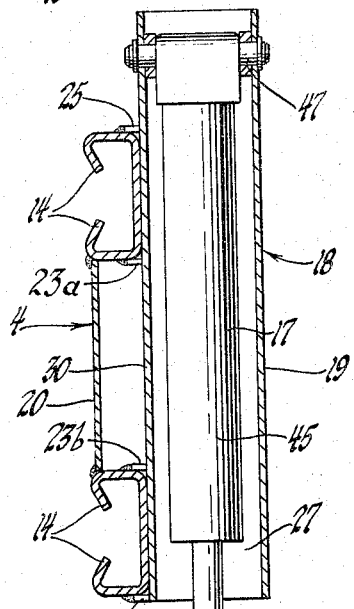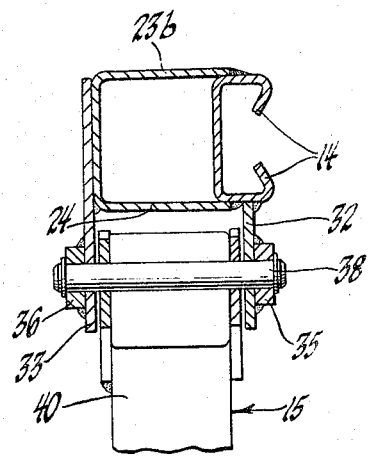

# United States Patent Office 3,276,603
Patented Oct. 4, 1966

3,276,603
BOOM SUPPORT
Fred W. Noller, Farmington, Mich., assignor to Massey-Ferguson Inc., Detroit, Mich.
Filed Apr. 5, 1965, Ser. No. 445,367
3 Claims. (Cl. 212—145)

This invention relates generally to supports for booms, cranes, hoists and the like, and is particularly, but not exclusively, concerned with supports for vehicle mounted mechanical shovels of the type commonly referred to as "backhoes."

In such apparatus, the backhose is generally mounted on a transverse frame attached to the rear end of a tractor or similar vehicle, and is connected to the tractor hydraulic system for operation. The operator manipulates hydraulic control levers from the tractor to swing the backhose boom about a vertical axis and to cause the backhoe shovel to dig into the ground for excavating operations.

In order to prevent the tractor from being overturned by the forces encountered during operation, stabilizers, usually hydraulically operated, are provided to engage the ground on either side of the tractor to spread the reaction forces and provide adequate stability. For transport, the stabilizers are retracted from engagement with the ground.

An object of this invention is to provide an improved boom support for backhoes and similar material handling apparatus including stabilizers movable between an operative, ground engaging position and an inoperative transport position in which the actuators for the stabilizers are supported within the framework for protection and act generally normal to the stabilizer legs.

Another object is to provide a boom support for transversely shiftable backhoe booms and the like having stabilizers movable between ground engaging and transport positions which can be individually extended and retracted selectively to increase and decrease the spread between the reaction forces and accommodate uneven terrain, and in which the actuators for the stabilizers are disposed to afford maximum resistance to the stabilizers collapsing from their operative positions without interfering with the operation or movement of the backhoe on the support.

A further object is to provide an improved boom support for backhoes and the like which is of rugged, lightweight, compact, economical construction and wherein the actuators for the stabilizers are protected from falling rocks and dirt during operation.

Still another object is to provide a boom support and stabilizer for tractor mounted backhoes wherein the operator has maximum visibility and in which the maximum spread between the stabilizers can be obtained without interfering with the backhoe operation.

Another object lies in the provision of a boom support for tractor mounted backhoes having hydraulically operated stabilizer legs in which the hydraulic actuators for the stabilizer legs are enclosed within a supporting frame for protection from rocks and dirt, and in which the actuators act generally normal to the stabilizer legs.

A boom support according to the present invention includes a frame adapted to be carried by a tractor with the frame lying in a transverse plane with respect to the longitudinal axis of the tractor. A pair of oppositely extending stabilizer legs are pivotally connected at their opposed, inner ends to the bottom of the frame at the center thereof for movement between ground engaging and transport positions. Actuators for the stabilizers are supported in housings formed within the frame and are inclined such that the lines of force of the actuators are generally normal to the stabilizer legs.

Other objects, advantages and features of the invention will become apparent from the following description taken in connection with the accompanying drawings in which:

FIG. 1 is a perspective view of a backhoe embodying the invention;

FIG. 2 is an elevational view of the boom supporting frame and stabilizer of FIG. 1; and FIGS. 3 and 4 are sectional views taken on lines 3—3 and 4—4 of FIG. 2.

It will be understood by those skilled in the art that the invention is not limited to the exact construction illustrated in the accompanying drawings and described in the foregoing specification, but that various other forms may be adopted without departing from the scope and spirit of the invention.

In FIG. 1, reference numeral 1 designates a tractor having rear wheels 2 and a seat 3 for the operator, the seat being shown in its rearwardly facing, backhoe operating position. Attached to the tractor is a transverse frame 4 on which is mounted a backhoe assembly 5.

The backhoe assembly includes a boom 6, dipper stick 7 and bucket 8 operated respectively by hydraulic actuators 6a, 7a and 8a. The boom 6 is pivotally mounted on a swing frame 9 by a pin 11. Swing frame 9 is in turn carried by a bracket 10 supported on the transverse frame 4, and is pivotally secured to bracket 10 by the shaft of a rotary motor 12 operable to swing the boom about the vertical axis of the motor shaft. Boom 6 pivots vertically about the horizontal axis of pin 11 upon actuation of the hydraulic actuator 6a. In the illustrated embodiment, a pair of vertically spaced rails 14 are mounted on frame 4, and bracket 10 is slideably supported on rails 14 for adjustable transverse movement on frame 4.

For preventing the tractor from tilting or overturning during operation of the backhoe, a pair of oppositely extending stabilizing legs 13 and 15 are mounted on frame 4 for movement between an operative ground engaging position and an inoperative, transport position by a pair of hydraulic ram actuators 16 and 17, respectively (FIG. 2), supported at their upper ends within frame 4.

With reference to FIGS. 2, 3 and 4, frame 4 includes a pair of downwardly and inwardly inclined housings or wells 18 supported at the ends of upper and lower beams 23a and 23b, respectively, in the form of rearwardly facing channel or C-shaped members. Projecting from the outer sides of housings 18 are upper and lower beams 26a and 26b, respectively, substantially coaxial with, and preferably of identical cross section to beams 23. Rails 14 are welded between the outer, rear edges of the upper and lower flanges of beams 23a, 26a and 23b, 26b as shown in FIG. 3.

Supported between the outer ends of beams 26a and b are side or end panels 21 and 22, and a rear panel 20 extends between end panels 21 and 22 with its upper and lower edges welded to rails 14. The upper horizontal flanges of beams 23a and 26a define the upper wall 25 of frame 4; the lower horizontal flanges of beams 23b and 26b define the bottom wall 24 of frame 4.

Housings 18 are defined by downwardly and inwardly inclined side walls 27 extending between a wall 19 and the forward vertical wall of rails 14, and a rear wall 30 extending between side walls 27 and abutting the forward vertical wall of rails 14 as shown in FIG. 3. Housings 18 project above the top wall of frame 4 with the actuators 16 and 17 supported between the upwardly projecting portions.

Projecting downwardly from the bottom wall 24 of frame 4 is a rear support plate 32 and a forward support plate 33 as shown in FIG. 4. Rear and front bearing plates 35 and 36 are welded respectively onto plates 32 and 33 through which extend pivot pins 37 and 38 for pivotally connecting stabilizer legs 13 and 15, respectively, to frame 4.

The stabilizer legs 13 and 15 are each made up of internal and external telescoping sections 39 and 40, respectively. As shown in FIG. 3, sections 39 and 40 are locked against relative movement by a pin 41 extending through an opening in section 40 and a hollow sleeve 42 mounted transversely in the hollow section 39. A series of sleeves 42 and corresponding openings in section 40 are provided to permit extension and retraction of section 39 with respect to section 40 to permit the length of legs 13 and 15 to be varied selectively as indicated in phantom lines in FIG. 1.

The hydraulic actuators 16 and 17 are in the form of hydraulic rams including a cylinder 45 and a reciprocating piston 46. Cylinder 45 is pivotally connected to the upper end of housing 18 between walls 19 and 30 by a pin 47 as shown in FIG. 3, and piston 46 is pivotally connected by a pin 48 with a bracket 44 welded or otherwise secured to a strap 43 extending around section 40. Thus, extension of hydraulic actuator 17 causes leg 15 to pivot downwardly about pin 38 toward its operative, ground engaging position; conversely, retraction of actuator 17 causes leg 15 to pivot upwardly toward its inoperative transport position along bottom wall 24 of frame 4. Pads 49 are mounted on the ends of section 39 of the stabilizer legs for supporting the stabilizers on the surface of the ground.

Actuators 16 and 17 are extended and retracted in response to manipulation of control levers 50 on a control unit 51 mounted on the upper wall of frame 4. Levers 50 also control actuators 6a, 7a and 8a of the backhoe 5, as well as the rotary motor 12.

Housings 18 and actuators 16 and 17 are inclined downwardly and inwardly with respect to frame 4 such that the lines of force of the actuators are generally normal to stabilizer legs 13 and 15. Moreover, actuators 16 and 17 act substantially at the longitudinal center lines of the stabilizer legs to minimize torsional stresses on the stabilizers. When operating on uneven ground, the internal section 39 of one of the stabilizer legs can be extended further than that of the other stabilizer leg to compensate for the uneven surface. On even ground, maximum stability is obtained by fully extending sections 39 to obtain the maximum spread between pads 49.

Since actuators 16 and 17 are supported within frame 4, and stabilizer legs 13 and 15 are mounted on the bottom wall of frame 4 and operate in the plane of the frame, there is no interference with the operation of the backhoe in any position along rails 14. The likelihood of the actuators being damaged by rocks and dirt is minimized since the actuators are enclosed on all sides by frame 4.

Frame 4 is of lightweight, economical construction, and yet has the strength and rigidity to withstand the heavy loads imposed by the backhoe during operation, and the visibility of the operator is not obscured by the frame.

Obviously, the invention is not limited to use with backhoes but may be employed to support cranes, hoists, elevators and similar equipment.

It will be apparent to those skilled in the art that alterations in the construction and arrangement of parts, and various equivalents may be employed without departing from the scope and spirit of the invention as defined in the appended claims.

I claim:
1. A boom support and stabilizer for backhoes and the like comprising: a frame including a pair of downwardly and inwardly inclined housings open at their lower ends and secured together in laterally spaced relationship, a pair of stabilizer legs mounted on said frame for movement between operative downwardly and outwardly inclined ground engaging positions and inoperative transport positions, each of said stabilizer legs extending beneath one of said housings, and an extensible and retractable actuator pivotally supported at one end in each of said housings and having its other end pivotally connected with the associated stabilizer leg extending therebeneath for actuating said associated stabilizer leg toward its operative and inoperative positions upon extension and retraction, respectively, of the actuator, said actuators each being inclined downwardly and inwardly from said one end such that the line of force of the actuator is generally normal to the stabilizer leg in its ground engaging position, and said other ends of the actuators each being connected to its associated stabilizer leg near the longitudinal axis thereof to minimize torsional stresses on the stabilizer legs.

2. A boom support and stabilizer as defined in claim 1 further including transverse frame members extending between said housings, and wherein said stabilizer legs have their inner ends pivotally connected to said transverse frame members between said housings and extend from their pivotal connections in opposite directions beneath their associated housings.

3. A boom support and stabilizer as defined in claim 1 wherein said frame has top, bottom and end walls and wherein said housings are located within said frame equi-distant from the vertical centerline of the frame on opposite sides thereof and the stabilizer legs extend in opposite directions from the vertical centerline and have their inner ends pivotally mounted adjacent the bottom wall of the frame near the center thereof.

References Cited by the Examiner
UNITED STATES PATENTS

| | | |
|---|---|---|
| 2,903,142 | 9/1959 | Wills. |
| 3,033,394 | 5/1962 | Kashergen. |
| 3,096,887 | 7/1963 | Thomas _____ 212—145 |

FOREIGN PATENTS 1,278,612  11/1961  France.

HUGO O. SCHULZ, *Primary Examiner.*